(12) United States Patent
Avrahami

(10) Patent No.: US 9,760,275 B2
(45) Date of Patent: Sep. 12, 2017

(54) TECHNOLOGIES FOR SKIPPING THROUGH MEDIA CONTENT

(71) Applicant: Intel Corporation, Santa Clara, CA (US)

(72) Inventor: Daniel Avrahami, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 320 days.

(21) Appl. No.: 14/251,173

(22) Filed: Apr. 11, 2014

(65) Prior Publication Data

US 2015/0293676 A1     Oct. 15, 2015

(51) Int. Cl.
*G06F 3/0488* (2013.01)
*G06F 3/0484* (2013.01)

(52) U.S. Cl.
CPC .......... *G06F 3/0488* (2013.01); *G06F 3/0484* (2013.01)

(58) Field of Classification Search
CPC .................................................... G06F 3/0488
USPC ....................................................... 715/720
See application file for complete search history.

(56) References Cited

U.S. PATENT DOCUMENTS

| 9,342,280 | B2* | 5/2016 | Patten | G06F 3/04883 |
| 2007/0236472 | A1* | 10/2007 | Bentsen | G06F 3/03547 345/173 |
| 2008/0084400 | A1* | 4/2008 | Rosenberg | G06F 1/1626 345/173 |
| 2008/0180394 | A1 | 7/2008 | Yun | |
| 2010/0088634 | A1 | 4/2010 | Tsuruta | |
| 2011/0050608 | A1* | 3/2011 | Homma | G06F 3/0414 345/173 |
| 2011/0197131 | A1 | 8/2011 | Duffin | |
| 2012/0032877 | A1* | 2/2012 | Watkins, Jr. | G06F 1/1624 345/156 |
| 2012/0036485 | A1* | 2/2012 | Watkins, Jr. | G06F 1/1626 715/863 |
| 2012/0166950 | A1 | 6/2012 | Frumar | |
| 2012/0304082 | A1* | 11/2012 | Patten | G06F 3/04883 715/760 |
| 2013/0067366 | A1* | 3/2013 | Almosnino | G06F 3/0483 715/764 |
| 2013/0257770 | A1* | 10/2013 | Tsaregorodtsev | G06F 3/0488 345/173 |

(Continued)

FOREIGN PATENT DOCUMENTS

WO     2013-142966     10/2013

OTHER PUBLICATIONS iPhone User guide, IOS 1.0 manufactured by Apple, Inc., Published on Aug. 1, 2007, 124 pages.*

(Continued)

*Primary Examiner* — Reza Nabi
(74) *Attorney, Agent, or Firm* — Barnes & Thornburg LLP

(57) ABSTRACT

Technologies for interacting with media content on a media consumption device include playing media content in a first display window displayed on a display screen. In response to receiving an input gesture, the first display window may be shifted on the display screen while the playback of the media content is adjusted based on the input gesture. Additionally, a new display window may be shifted on to the display screen. A frame of the media content occurring at a determined skip point may be displayed in the new display window.

22 Claims, 9 Drawing Sheets

(56) References Cited

U.S. PATENT DOCUMENTS

| | | | | |
|---|---|---|---|---|
| 2013/0275924 A1* | 10/2013 | Weinberg | ................ | G06F 3/017 715/863 |
| 2013/0307792 A1* | 11/2013 | Andres | ................ | G11B 27/005 345/173 |
| 2014/0002594 A1* | 1/2014 | Chan | .................... | H04N 19/597 348/43 |
| 2014/0173484 A1* | 6/2014 | Hicks | .................... | G06F 3/0486 715/769 |
| 2014/0178047 A1* | 6/2014 | Apodaca | ................ | G06F 3/041 386/248 |
| 2014/0376887 A1* | 12/2014 | Tijssen | .................... | G11B 27/34 386/282 |
| 2015/0074532 A1* | 3/2015 | Lapidot | .................... | G06F 3/017 715/719 |
| 2015/0199994 A1* | 7/2015 | Thorn | .................... | G11B 27/10 386/227 |
| 2015/0293676 A1* | 10/2015 | Avrahami | ............. | G06F 3/0484 715/720 |
| 2015/0370402 A1* | 12/2015 | Checkley | ......... | H04N 21/41407 345/173 |

OTHER PUBLICATIONS

Dragicevic, Pierre et al., "Video Browsing by Direct Manipulation," CHI 2008 Proceedings, Improved Video Navigation and Capture, Apr. 5-10, 2008, Florence, Italy, pp. 237-246.
International Search Report for PCT/US15/019106, dated May 29, 2015 (3 pages).
Written Opinion for PCT/US15/019106, dated May 29, 2015 (8 pages).

* cited by examiner

TECHNOLOGIES FOR SKIPPING THROUGH MEDIA CONTENT

BACKGROUND

Computing devices with touchscreen displays have become commonplace as platforms on which media content, such as video content, can be consumed by a user. In particular, mobile computing devices are quickly becoming the standard platform on which users view video content. Due to the size and mobility of the mobile computing devices, those devices typically have limited physical control functionality and rely on the use of included touchscreen displays to provide user control.

The limited control functionality of many computing devices present one potential drawback to consuming video and other media content on such computing devices. For example, video content consumed on a computing device typically cannot easily be scanned by the user. For example, in order to find out more about the contents of a video, the user may be required to watch the video in its entirety at normal playback speed, or slide their finger along a progress bar to scrub through portions of the video content, stop, and examine portions of interest in the video. Such methodology can be both slow and cumbersome, especially when the video content is being watched on a small computing device such as a smartphone.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
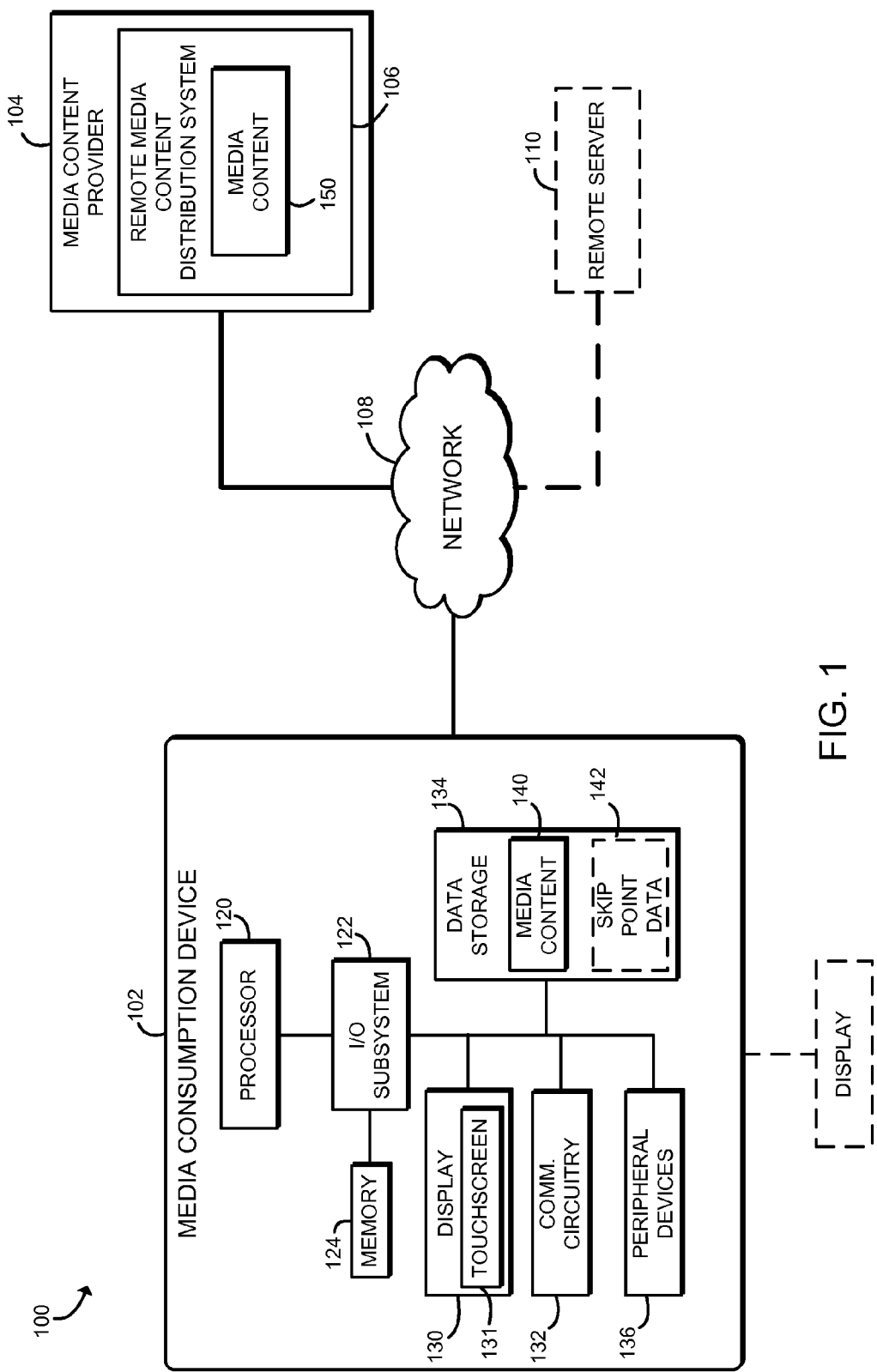
FIG. 1 is a simplified block diagram of at least one embodiment of a system for playback of media content on a media consumption device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for playback of media content includes a media consumption device 102 and one or more media content providers 104, which may communicate with the media consumption device 102 over a network 108. In use, the media consumption device 102 may obtain media content from a remote media content provider 104, or other media source, and present the media content to a user of the media consumption device 102 (e.g., display video content on a display device). A user may operate the media consumption device 102 to initiate playback of the media content. The user may also operate the media consumption device 102 to perform other control functions to interact with the media content. For example, prior to, or during playback of media content, through interaction with a display of the media consumption device 102, such as via reception of an input gesture (e.g., a swipe), the user may operate the media consumption device 102 to skip through media content such that the user is not required to view, or otherwise experience, the video content at its normal playback speed. Based on the input gesture, the media consumption device 102 is configured to skip through the media content by advancing ("fast-forwarding") or backtracking ("rewinding") the video content in a primary display window, while displaying an additional video frame of the video content in a separate display window. The video frame displayed in the separate display window is based on a previous or next skip point, which is based on the input gesture received from the user, to provide the user with a glimpse of the video content at the corresponding skip point. It should be appreciated that the media content consumed via the media consumption device 102 may be embodied as any type of media content including, but not limited to, a personally or professionally produced video, movie, a television show, an advertisement, a music video, or other type of media content.

The media consumption device 102 may be embodied as any type of computing device on which, or via which, media content may be presented or otherwise consumed by a user. For example, the media consumption device 102 may be embodied as a set-top-box, a digital media adapter, a digital media extender, a digital media streamer, a digital media hub, a digital recorder, a "smart" television or appliance, a smartphone, a tablet computer, a notebook computer, a laptop or other mobile computer, a desktop computer, or other computing device. As shown in FIG. 1, the illustrative media consumption device 102 includes a processor 120, an input/output subsystem 122, a memory 124, a display 130, a communication circuit 132, a data storage device 134, and one or more peripheral devices 136. Of course, the media consumption device 102 may include other or additional components, such as those commonly found in a media consumption device or other computing device (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the media consumption device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the media consumption device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the media consumption device 102, on a single integrated circuit chip.

The display 130 of the media consumption device 102 may be embodied as any type of display capable of displaying digital information such as a liquid crystal display (LCD), a light emitting diode (LED), a plasma display, a cathode ray tube (CRT), or other type of display device. In some embodiments, the display 130 may be coupled with a touchscreen 131 to facilitate user interaction. Although the illustrative media consumption device 102 includes the display 130 (e.g., incorporated therein), it should be appreciated that the media consumption device 102 may be communicatively coupled to a separate display device 160 in some embodiments. In such embodiments, the media consumption device 102 may or may not include the display 130. For example, in embodiments in which the media consumption device 102 is embodied as a set-top-box or digital media adapter, the media consumption device 102 may be coupled to a separate display device 160 such as a video monitor or television.

The communication circuit 132 of the media consumption device 102 may be embodied as any communication circuit, device, or collection thereof, capable of enabling communications between the media consumption device 102 and the remote media content provider 104 and/or other remote servers 110 via the network 108. The communication circuit 132 may be configured to use any one or more communication technology (e.g., wireless or wired communications) and associated protocols (e.g., Ethernet, Bluetooth®, Wi-Fi®, WiMAX, etc.) to effect such communication.

The data storage device 134 may be embodied as any type of device or devices configured for short-term or long-term storage of data such as, for example, memory devices and circuits, memory cards, hard disk drives, solid-state drives, or other data storage devices. In some embodiments, the media consumption device 102 may store media content 140, or a portion of the media content 140, in the data storage 134. Such stored media content 140 may be received from the media content provider 104 as standard broadcasting content, streaming content, pay-per-view content, or other media content. For example, in some embodiments, the media consumption device 102 may be configured to automatically record media content received from the media content provider 104 and store the recorded media content 140 in the data storage device 134. Of course, user-generated or user-obtained media content 140 may also be stored in the data storage device 134. Additionally, as discussed in more detail below, the media consumption device 102 may generate, determine, or otherwise retrieve skip points 142 (e.g., reference points in time or content characteristic corresponding to particular frames in the media content) from the media content providers 104 or other remote servers 110, which may be configured to generate skip points for media content. In such embodiments, the media consumption device 102 may also store the skip points 142 in the data storage 134.

In some embodiments, the media consumption device 102 may further include one or more peripheral devices 136. Such peripheral devices 136 may include any type of peripheral device commonly found in a server computing device such as a hardware keyboard, input/output devices, peripheral communication devices, and/or other peripheral devices.

As discussed above, the media consumption device 102 may receive, or otherwise obtain, media content from one or more media content providers 104. The media content provider 104 may be embodied as any type of content provider including, but not limited to, a multichannel video programming distributor (MVPD) configured to provide pay-for or free video programming services to viewers via the network 108, television broadcast network configured to transmit television shows to viewers over-the-air and/or via the network 108, online media content providers configured to transmit media content over data networks of the network 108, and/or other content providers. As discussed above, in some embodiments, the media consumption device 102 may be configured to store media content received from the media content provider(s) 104.

Each media content provider 104 may operate one or more remote media content distribution systems 106. The remote media content distribution systems 106 may be embodied as any device, collection of devices, or system configured to distribute media content to the media consumption device. The particular structure of each remote media content distribution system 106 may be dependent on the type of media content provider 104 operating the particular remote media content distribution system 106. For example, in the case of an online media content provider, the associated remote media content distribution system 106 may be embodied as a data server or collection of data servers. As such, the remote media content distribution system 106 may include components, such as a processor, memory device, communication circuitry, and data storage, similar to the components of the media consumption device 102, the description of each of which is equally applicable to such components of the remote media content distribution system 106. Additionally or alternatively, in those embodiments in which the media content provider 104 is embodied as a multichannel video programming distributor, the remote media content distribution system 106 may include various media servers, satellites, cable TV systems, air broadcast systems, and/or additional devices, structures, subsystems, and networks.

Regardless of the particular structure, each remote media content distribution system 106 may store and manage various media content 150, the type and volume of which may depend on the content provider operating the remote media content distribution system 106. For example, in embodiments in which the remote media content distribution system 106 is operated by a television broadcast network, the media content may include shows, movies, news, and/or similar content.

In some embodiments, the system 100 may also include one or more remote servers 110. The remote server 110 may be embodied as any type of computer server or device capable of communicating with the media consumption device 102 over the network 108. In the illustrative embodiment, the remote server 110 is configured to analyze media content (e.g., media content obtained from the media content provider 104 and/or from the media consumption device 102) and generate skip points for the media content using the technologies disclosed below. The media consumption device 102 may subsequently retrieve the generated skip points for a particular media content from the remote server 110 periodically or on an as-needed basis.

Although the illustrative system 100 of FIG. 1 includes only one media content provider 104 and one remote server 110, it should be appreciated that the system 100 may include additional media content providers 104 and/or remote servers 110 in other embodiments. Additionally, although the media content provider 104 of is shown in FIG. 1 has including a single remote media content distribution system 106, each media content provider 104 may include multiple remote media content distribution systems 106 in other embodiments. As such, the system 100 may include multiple remote media distributions systems 106 operated by one or more media content providers 104 in some embodiments.

The network 108 may be embodied as any type of communication network capable of facilitating communication between the media consumption device 102 and the remote media content distribution system 106. As such, the network 108 may include one or more networks, routers, switches, computers, and/or other intervening devices. For example, the network 108 may be embodied as or otherwise include one or more local or wide area networks, cellular networks, publicly available global networks (e.g., the Internet), an ad hoc network, a short-range communication network or link, or any combination thereof.

Figure 2:
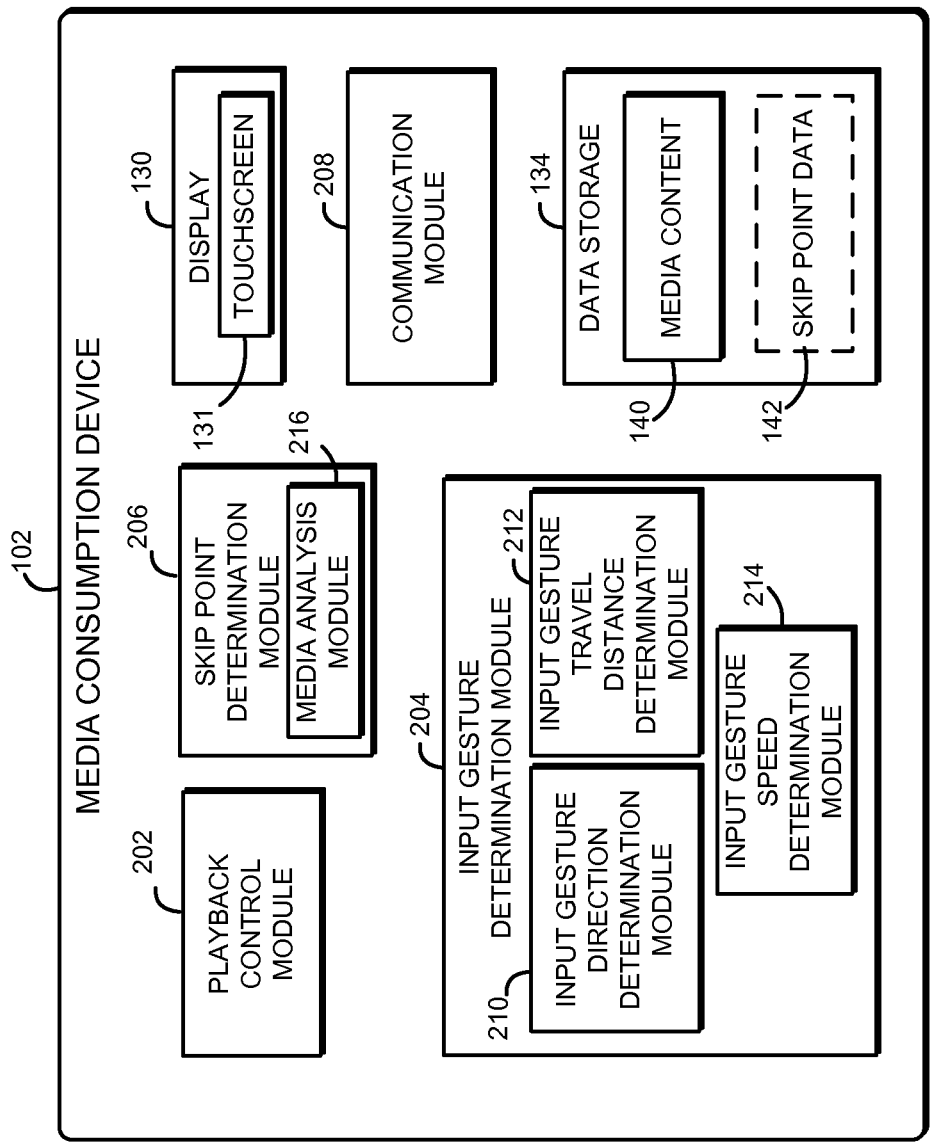
FIG. 2 is a simplified block diagram of at least one embodiment of an environment of a media consumption device of the system of FIG. 1.
Figure 3:
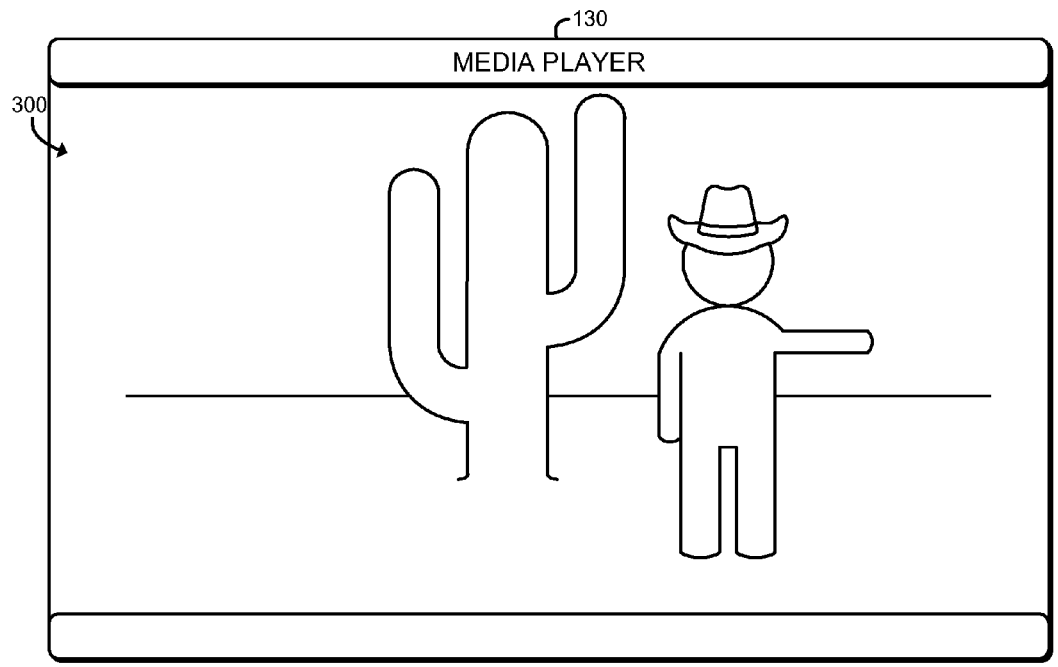
FIGS. 3-6 are simplified illustrative diagrams of playback of media content on the media consumption device of FIG. 1 in response to interaction by a user.

Referring now to FIG. 2, in use, the media consumption device 102 establishes an environment 200. The illustrative environment 200 includes a playback control module 202, an input gesture determination module 204, a skip point determination module 206, and a communication module 208. Each of the playback control module 202, the input gesture determination module 204, the skip point determination module 206, the communication module 208, and other modules of the environment 200 may be embodied as software, firmware, hardware, or any combination thereof.

The playback control module 202 manages the playback and presentation of media content locally stored on the media consumption device 102 (e.g., the media content 140 stored in the data storage 134) and/or received from the remote media content distribution system 106 via the communication module 208 (e.g., streamed media content). As discussed in more detail below, the playback control module 202 may forwardly or backwardly skip through the media content in response to an input gesture received from a user. Additionally, the playback control module 202 may display a frame of the media content in a separate window at a previous or next skip point of the media content to provide the user with a view of media content corresponding to that particular skip point. The playback control module 202 may also control the position and movement of various display windows in which the media content is displayed on the display 130 as discussed below.

The input gesture determination module 204 is configured to determine characteristics of an input gesture received from a user. The input gesture may be embodied as any type of input gesture including, but not limited to, a movement gesture such as a swipe gesture or an input termination gesture (e.g., a tap gesture or other gesture indicative of the user's removal of a finger from the touchscreen 131). In the illustrative embodiment, the input gesture determination module 204 includes an input gesture direction determination module 210, an input gesture travel distance determination module 212, and an input gesture speed determination module 214.

The input gesture direction determination module 210 is configured to determine a direction of an input gesture received from the user via the touchscreen 131 of the display 130 of the media consumption device 102. The determined direction may be indicative of the direction of the motion of the input gesture. For example, the input gesture may take the form of a substantially horizontal swipe across the screen using a finger of the user. In such cases, the input gesture direction determination module 210 may determine whether the general direction of the swipe was in a left-to-right direction or a right-to-left direction. Alternatively, the input gesture may take the form of a substantially vertical swipe on the display screen. In such cases, the input gesture direction determination module 210 may be configured to determine whether the general direction of the swipe is an upwardly direction or a downwardly direction.

The input gesture travel distance determination module 212 is configured to determine a traveled distance of the input gesture on the display 130. For example, the input gesture travel distance determination module 212 may determine the length (i.e., distance traveled) of a movement input gesture. To do so, the input gesture travel distance determination module 212 may determine an initial location of the input gesture on the touchscreen 131 (e.g., an origination point on the touchscreen 131 at which the input gesture originated) and a current location of the input gesture on the touchscreen 131. The traveled distance of the input gesture may be determined by comparing the current and initial locations (i.e., displacement between the locations). Accordingly, the input gesture travel distance determination module 212 may determine the current location of the input gesture on the touchscreen 131 as part of traveled distance calculation, which may be used for other functionality such as determining whether the input gesture has reached a side of the display screen of the display 130.

The input gesture speed determination module 214 is configured to determine a speed of the input gesture on the display 130. The determined speed may be indicative of the speed at which the movement gesture (e.g., a swipe gesture) traverses the touchscreen 131. For example, the input gesture speed determination module 214 may calculate the speed by computing the displacement of the location of the contact point of the user's finger on the touchscreen 131 (such as determined by the input gesture travel distance determination module 212 discussed above) over time.

The skip point determination module 206 is configured to select, or otherwise determine, a skip point of the media content based on the input gesture. In the illustrative embodiment, each skip point is embodied as a reference point in time of the media content, which corresponds to a particular frame of the media content. The skip points may be relative or absolute in time. For example, some skip points may be relative to the currently viewed media content frame (e.g., thirty seconds prior to or after the currently view frame of the media content). Alternatively, some skip points may correspond to an absolute point in time (e.g., the frame occurring five minutes and thirty seconds after the beginning of the media content). As discussed in more detail below, the absolute skip points may correspond to pre-defined chapters of the media content, scene changes in the media content, specific content or other qualities of the media content, or otherwise be generated based on an analysis of the media content.

The use of skip points of the media content allows a user to effectively "skip" forward or backward within the media content to a designated frame for playback, without viewing the media content at a normal playback speed. In the illustrative embodiment, the skip point determination module 206 selects or determines the particular skip point to be used (i.e., the frame to be displayed in a secondary display window as discussed below) based on a direction of movement of the input gesture (i.e., in response to a movement input gesture). For example, the skip point determination module 206 selects or otherwise determines a next skip point located later in the media content relative to the current frame of the media content displayed in the primary display window based on a determination that the direction of movement of the movement gesture is in a leftwards direction (i.e., right-to-left). Alternatively, the skip point determination module 206 selects or otherwise determines a previous skip point located prior in the media content relative to the current frame of the media content displayed in the primary display window based on a determination that the direction of movement of the movement gesture is in a rightwards direction (i.e., left-to-right).

In some embodiments, the skip points may be embodied as predefined skip points previously associated with the media content. For example, in some embodiments, the skip points may be included as metadata associated with the media content or provided by a third-party (e.g., the media content provider 104) as separate data indicative of the skip points. In such embodiments, the media consumption device 102 may retrieve the particular skip points from the data storage 134 or directly from the metadata or other local source. Alternatively, in some embodiments, the media consumption device 102 may retrieve a predefined skip point from a remote source. For example, in some embodiments, the remote server 110 may be configured to generate or otherwise store skip point data, which the media consumption device 102 may retrieve on an as-needed basis.

Alternatively, in other embodiments, the skip points may be generated or otherwise determined at "run time" or on an as-needed basis. In such embodiments, the skip point determination module 206 includes the media analysis module 216, which is configured to analyze the media content and generate possible skip points based on such analysis. As discussed in more detail below, the skip points may be generated based on various aspects of the media content including, but not limited to, chapter points in the media content, scene transitions, particular scenes of interest, temporal points of the media content, and/or other criteria or characteristics of the media content.

As discussed above, the playback control module 202 may perform various window shifting operations and playback adjustments of media content based on the input gesture received from the user. For example, referring to FIGS. 3-6, the playback control module 202 is configured to play a requested media content in a primary display window 300 displayed on the display 130 of the media consumption device 102. The primary display window 300 is embodied as the main content window of the media consumption device 102 in which the media content is typically displayed and via which the user may watch, or otherwise consume, the media content. In the illustrative embodiment, the primary display window 300 occupies all or most of the display 130.

Figure 4:
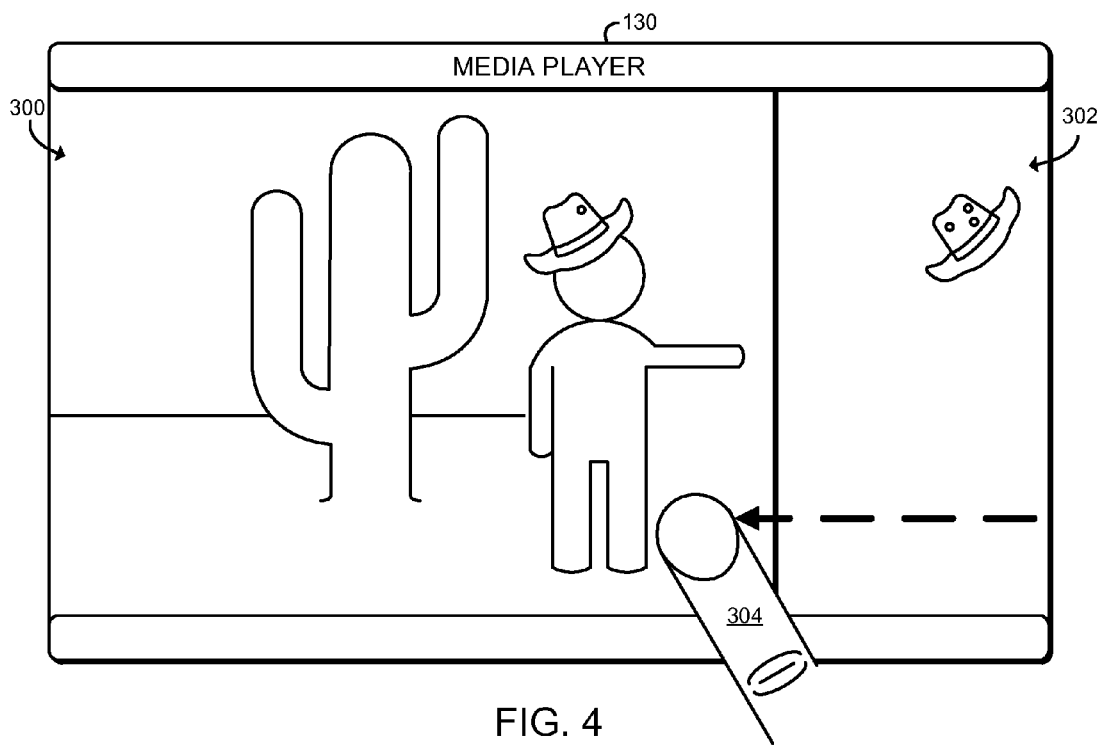

In response to receiving an input gesture (i.e., a movement input gesture) from the user 304, the playback control module 202 is configured to move the primary window and adjust playback of the media content (e.g., skip through the media content based on the input gesture) in the primary display window 300. Additionally, the playback control module 202 displays the media content at a previous or next skip point, depending on the movement input gesture, in a new display window 302, which is moved onto the display 103. For example, as shown in FIG. 4, the user has interacted with the media consumption device 102 by swiping her finger 304 across the display 130. In response, the playback control module 202 is configured to laterally shift the primary display window 300 in the same general direction as the determined direction of the input gesture. That is, in the illustrative embodiment of FIG. 4, the playback control module 202 shifts the primary display window 300 toward the left side of the display 130 in response to receiving the illustrative right-to-left movement input gesture from the user's finger 304, resulting in an increasing portion of the primary display window 300 being moved off of the display 130 as the movement input gesture approaches the left side of the display 130 (see FIGS. 4 and 5). Subsequently or concurrently, the playback control module 202 laterally shifts a new display window 302 onto the display 130 from the right side of the display 130, resulting in an increasing portion of the new display window being displayed on the display 130 as the movement gesture approaches the left side of the display 130.

Additionally, as discussed above, the playback control module 202 displays a frame of the media content at the next (or previous) skip point in the new display window 302. While the skip point determination module 206 may determine both of the next and previous skip points prior to or in response to user interaction with the media content, the particular skip point to be used (i.e., the next or the previous skip point) is selected based on the user's input gesture. For example, a next or future skip point may be selected in response to a right-to-left movement input gesture, while a previous or past skip point may be selected in response to a left-to-right movement gesture. In the illustrative embodiment of FIG. 4, the playback control module 202 displays a frame of the media content at the next skip point in response to the illustrative right-to-left movement input gesture from the user's finger 304, resulting in a forward skip to that particular frame of the media content. Of course, should the movement input gesture be in the opposite direction (i.e., a left-to-right movement input gesture), the playback control module 202 is configured to shift the primary display window 300 toward the right side of the display 130 and shift the new display window 302 onto the display 130 from the left side of the display 130. The playback control module 202 would display the media content in the new display window 302 at a previous skip point, resulting in a backward skip to that particular frame of the media content.

Figure 5:
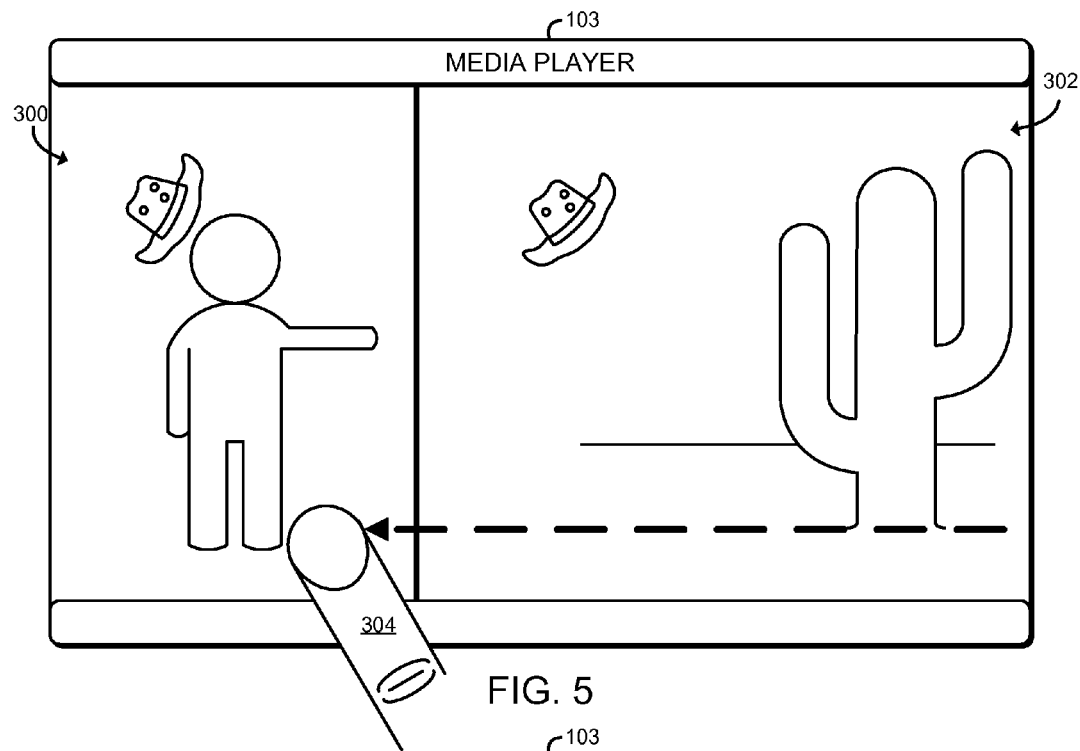
Figure 6:
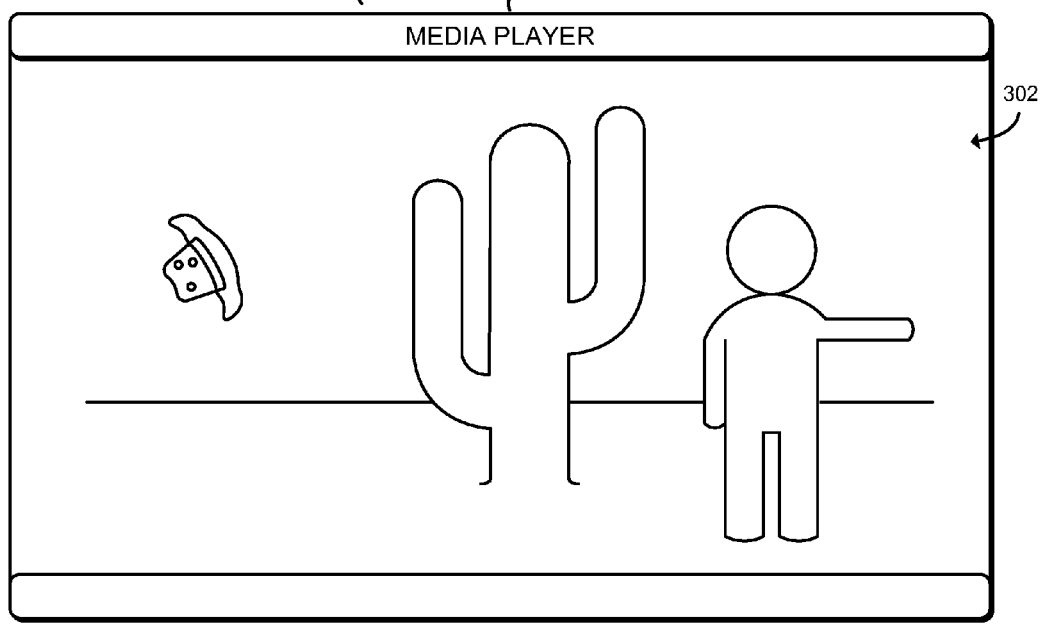

While playback control module 202 shifts the primary display window 300 and the new display window 302 on the display 130, the playback control module 202 also skips (e.g., a forward or backward skip) through the media content displayed in the primary display window 300 based on the determined direction and travelled distance of the input movement gesture. For example, as shown in FIGS. 4-6, the playback control module 202 forwardly skips or otherwise advances through the media content displayed in the primary display window 300 as the user swipes across the display 130 using a right-to-left movement input gesture. In the illustrative embodiment, the amount of media content that is skipped or advanced through in the primary display window 300, as well as the distance at which the primary display window 300 is shifted, is based on the determined travelled distance of the movement input gesture. That is, as the user swipes across the display 130, the playback control module 202 skips forwardly or backwardly through the media content displayed in the primary display window 300 by a greater amount. Stated differently, the amount of media content that is skipped in the primary display window 300 is directly proportional to the travelled distance of the movement input gesture. For example, in the illustrative embodiment, should the user initially touch the display 130 near the center of the touchscreen 131 and subsequently swipe to a point halfway between the center and the left edge of the display 130, the playback control module 202 would skip to a frame of the media content occurring approximately halfway between the initial frame of the media content displayed in the primary display window 300 at the time of interaction by the user and the previous or next skip point, depending on the direction of the swipe gesture. Additionally, as the user moves her finger closer to the edge of the display 130, the amount media content that is skipped increases until the frame displayed in the primary window 300 is the previous or subsequent frame of the media content relative to the frame of media content displayed in the new display window 302, again depending on the direction of the swipe gesture (i.e., a "fast-forward" or a "rewind" gesture).

Figure 7:
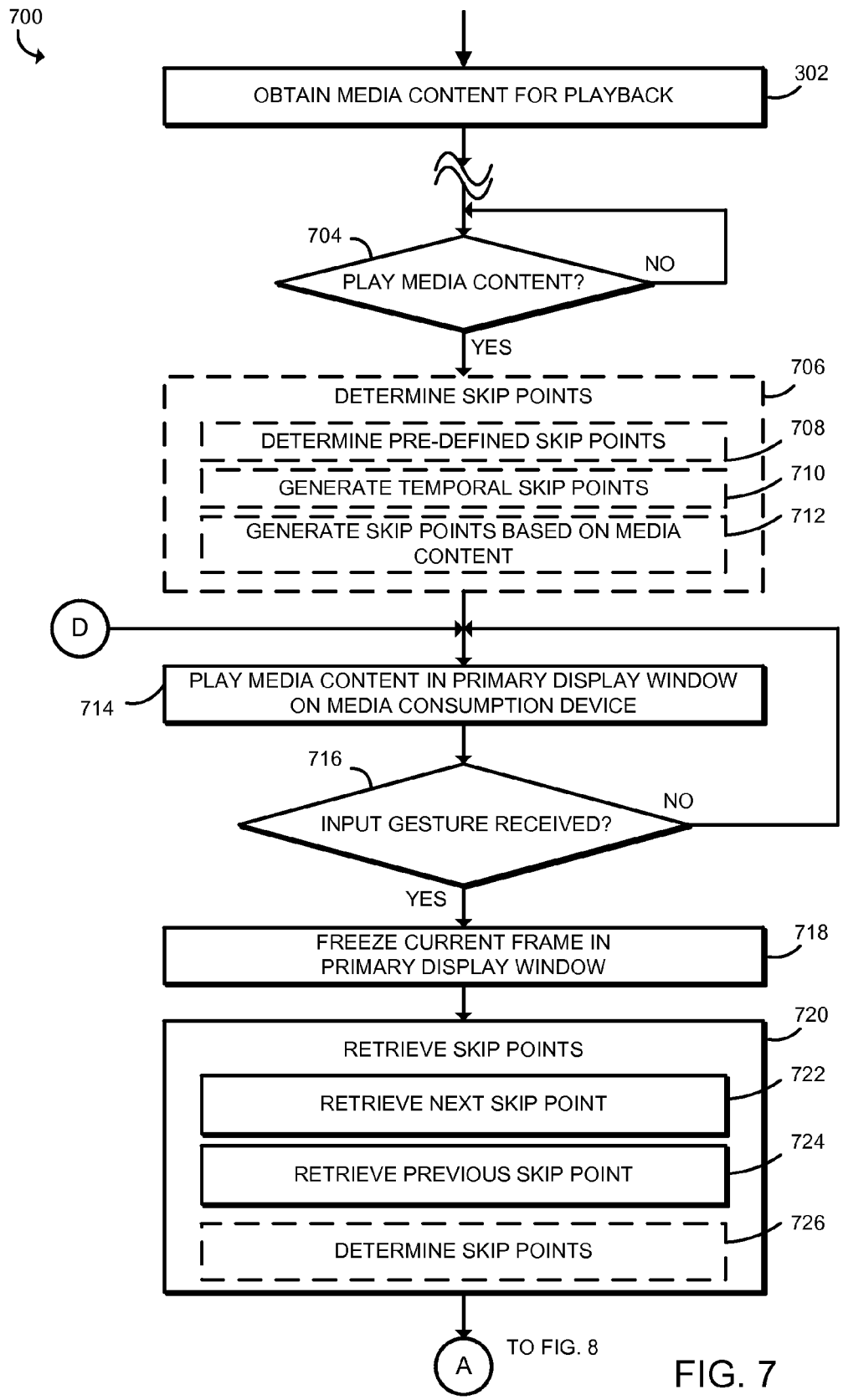
FIGS. 7-10 are simplified flow diagrams of at least one embodiment of a method for playback of media content that may be executed by the media consumption device of FIGS. 1 and 2.
Figure 8:
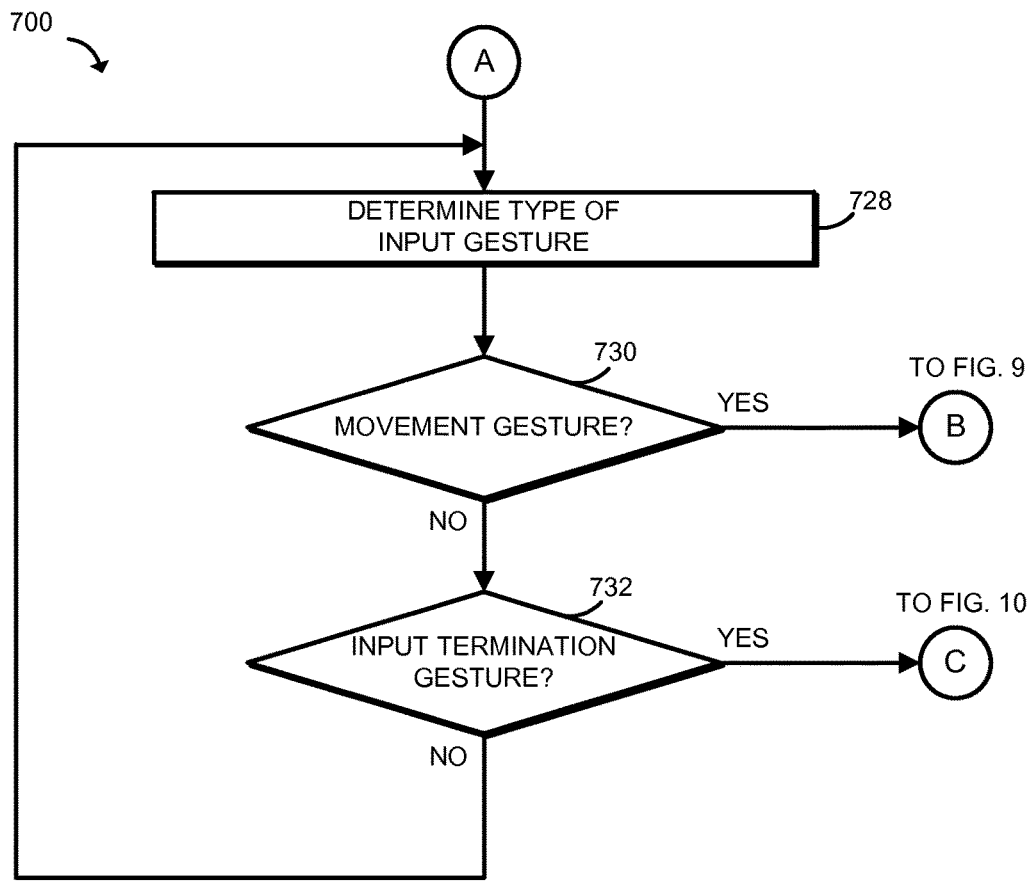
Figure 9:
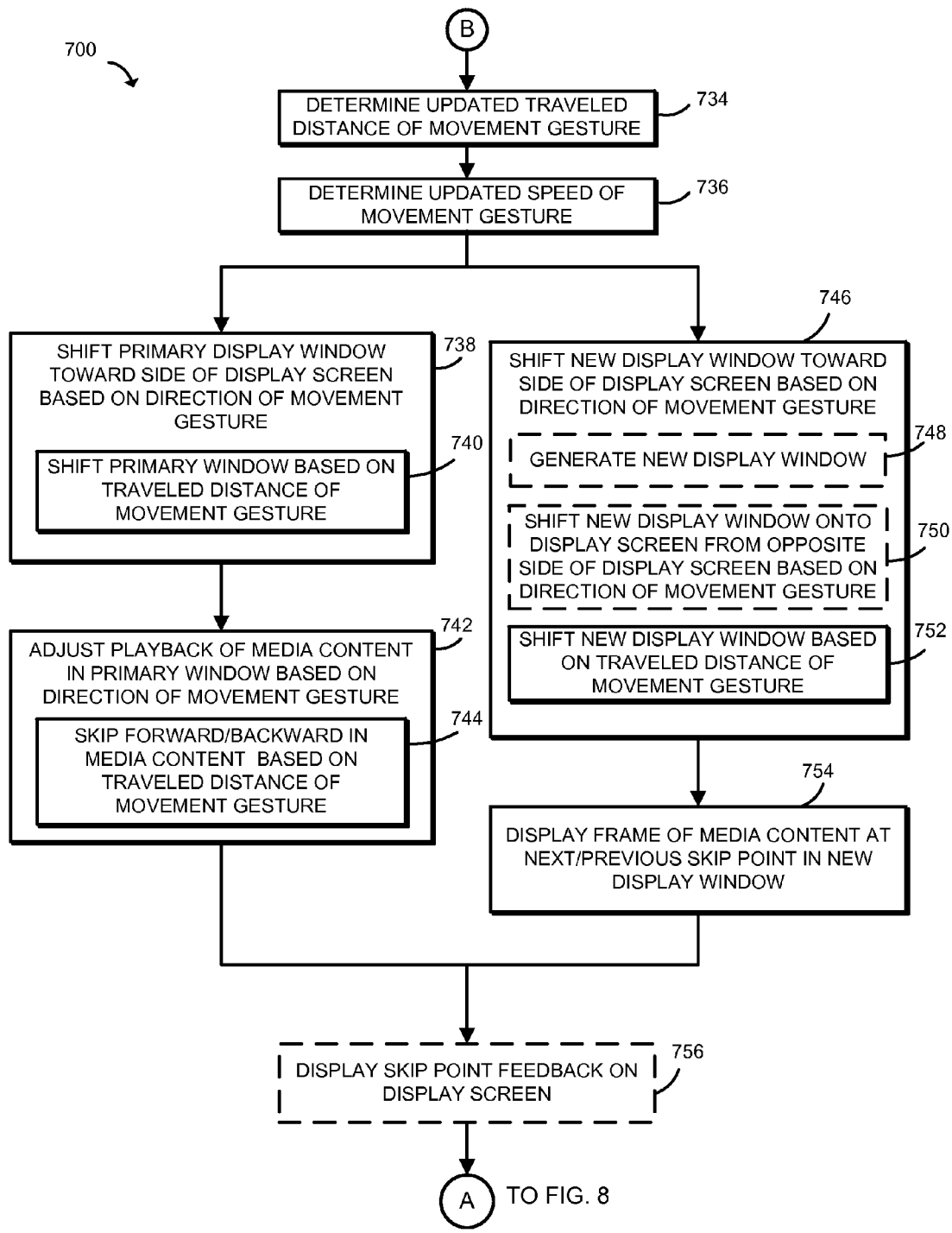

Referring now to FIGS. 7-9, in use, the media consumption device 102 may execute a method 700 for playback of media content on the media consumption device 102. The method 700 begins with block 702 in which the media consumption device 102 obtains media content for playback. As discussed above, the media content may be stored locally (e.g., in the data storage 134) or may be obtained from one or more of the remote media content distribution systems 106 (e.g., streaming or live content). After the media content has been obtained, the method advances to block 704 in which the media consumption device 102 determines whether a user has requested to play media content.

If the user has requested playback of the media content in block 704, the method 700 advances to block 706 in some embodiments. In such embodiments, the skip point determination module 206 determines or generates one or more skip points for the obtained media content (i.e., prior to playback of the media). As discussed above, a skip point may refer to a reference point in time corresponding to a frame in the media content, which may be effectively "skipped" to based on interaction by the user as discussed above. As such, a skip point may correspond to a frame occurring at a point in time prior to, or later than, the frame currently being played in the primary display window 300. In some embodiments, the media consumption device 102 determines all of the available skip points for the obtained media content in block 306. However, in other embodiments, only one or a portion less than all of the available skip points may be determined in block 306.

The media consumption device 102 may determine the skip points by retrieving, or otherwise determining, pre-defined skip points or by analyzing the obtained media content itself. For example, in some embodiments in block 308, the skip point determination module 206 may determine or retrieve pre-defined skip points for the obtained media content. For example, in some embodiments, the skip point determination module 206 may retrieve or obtain pre-defined skip points from metadata associated with the media content or other data indicative of the pre-defined skip points. In such embodiments, the metadata or other data may be received in associated with the media content received from the media content provider 104 and subsequently locally stored in the data storage 134. Alternatively, the skip point determination module 206 may retrieve the metadata or other data indicative of the skip points for the obtained media content from an external source, such as the remote server 110. In this way, third parties may generate different sets of skip points for the same media content (e.g., different sets of skip points for a particular movie), and the user of the media consumption device 102 may determine which set of skip points to be used while viewing the media content.

Additionally or alternatively, the skip point determination module 206 may be configured to determine, or otherwise generate, the skip points based on the media content. For example, in block 710, the skip point determination module 206 may determine or generate skip points for the media content based on temporal points of the media content. In some embodiments, for example, the skip point determination module 206 may determine skip points occurring at particular time intervals of the media content (e.g., every 30 seconds, every 60 seconds, etc.). In such embodiments, the time interval of the skip points may be controlled or adjusted by the user of the media consumption device 102. Of course, in embodiments in which temporal skip points are used, the skip point determination module 206 may determine or generate the skip points in response to receiving an input gesture from the user, rather than prior to playback of the media content (see, e.g., discussion of block 722 below). Additionally or alternatively, the skip point determination module 206 may generate skip points for the media content based on an analysis of the media content in block 712. To do so, the media consumption device 102 may execute a method 1100 for analyzing media content to determine skip points as discussed below in regard to FIG. 7.

If the user has requested playback of the media content in block 704, and after or contemporaneously with any determination of skip points that may be performed in block 706, the media consumption device 102 begins playback of the requested media content in the primary display window 300 in block 716. During the playback of the media content, the input gesture determination module 204 of the media consumption device 102 monitors for input gestures received from the user in block 716. If no input gesture is received, the method 700 loops back to block 714 in which the media consumption device 102 continues to play the media content in the primary display window 300.

However, if an input gesture is received in block 716, the method 700 advances to block 718 in which the playback control module 202 momentarily freezes the media content at the current frame in the primary display window 300. It should be appreciated that the playback control module 202 may freeze the media content displayed in the primary display window 300 upon initial interaction by the user (e.g., upon a "touch down" of the user's finger on the touchscreen 131), prior to any movement input gesture. Subsequently, in block 720, the skip point determination module 206 retrieves skip points of the media content. In the illustrative embodiment, the playback control module 202 retrieves both of the next and previous skip points in block 720 to ensure the playback control module 202 can display the correct frame of the media content in the new display window 302 based on the type of input gesture received in block 716. For example, in block 722, the skip point determination module 206 may determine, or otherwise retrieve, the next skip point relative to the current frame displayed in the primary display window 300. It should be appreciated that the next skip point may be embodied as the next consecutive skip point corresponding to a frame occurring later in the media content than the currently displayed frame of the primary display window 300. Additionally, in block 724, the skip point determination module 206 may determine, or otherwise retrieve, the previous skip point relative to the current frame displayed in the primary display window 300. It should similarly be appreciated that the previous skip point may be embodied as the next consecutive skip point corresponding to a frame occurring in the media content prior to the currently displayed frame of the primary display window 300. Alternatively, in some embodiments, the playback control module 202 may retrieve only the next or previous skip point after determining the direction of a movement input gesture. Of course, in such embodiments, the display of the frame of media content at the next or previous skip point may be slightly delayed due to the reactionary retrieval of the skip point. Additionally, in those embodiments in which the skip points are not predefined or otherwise previously determined in block 706, the skip point determination module 206 may determine or generate the previous or next skip point(s) in block 726. To do so, the skip point determination module 206 may use any of the methodologies for determining or generating skip points as discussed above in regard to block 706.

After the relative skip points have been retrieved, generated, or otherwise determined in block 720, the method 700 advances to block 728 (see FIG. 4) in which the input gesture determination module 204 determines the input gesture type of the received input gesture. For example, an input gesture may be in the form of a tap input, with a simple touch on the touchscreen 131 without any motion along the surface of, or relative to, the touchscreen 131 of the display 130. Such a simple tapping touch input, without motion along the surface of the touchscreen 131, may be contrasted with an input gesture that includes motion along the surface of the touchscreen.

As such, in block 730, the input gesture determination module 204 determines whether the input gesture is a movement gesture (e.g., a left-to-right or a right-to-left swipe gesture). If not, the method 700 advances to block 732 in which the input gesture determination module 204 determines whether the received input gesture is an input germination gesture. That is, the input gesture determination module 204 determines whether the received input gesture has completed in block 732. For example, the input gesture determination module 204 may determine that the user has removed his or her finger (i.e., touch up) from the surface of the touchscreen 131 of the display 130 in block 732. If not, the method 700 loops back to block 728 in which the input gesture determination module 204 continues to monitor the input gesture.

Referring back to block 730, if input gesture determination module 204 determines that the input gesture is a movement gesture (e.g., a left-to-right or a right-to-left swipe gesture), the method 700 advances to block 734 (see FIG. 9). In block 734, the input gesture determination module 204 determines an updated traveled distance (e.g., a change in the horizontal position of the finger on the touchscreen 131) of the current input movement gesture. It should be appreciated that the determined traveled distance may be updated as the user continues to swipe her finger 304 across the display 130. As discussed above, the traveled distance of the input movement gesture may be determined by comparing the current position of the user's finger on the display 130 (i.e., the touchpoint of the user finger or stylus on the touchscreen 131) to the initial position of the user's finger on the display 130 when starting the input movement gesture. Additionally, in block 736, the input gesture determination module 204 determines an updated speed of the current input movement gesture. Again, it should be appreciated that the determined speed of the input movement gesture may be updated as the user continues to swipe her finger 304 across the display 130.

After the traveled distance and speed of the current input movement gesture has been determined in blocks 734 and 736, the method 700 advances to blocks 738 and 746. In block 738, the playback control module 202 shifts the primary display window 300 based on the movement of the input gesture. That is, the playback control module 202 shifts the primary display window 300 based on the direction of the input movement gesture. For example, if the input movement gesture is determined to be a left-to-right movement gesture, the playback control module 202 shifts the primary display window 300 toward the right side of the display 130. Alternatively, if the input movement gesture is determined to be a right-to-left movement gesture, the playback control module 202 shifts the primary display window 300 toward the left side of the display 130.

In the illustrative embodiment, the shifting of the primary display window 300 is based on the updated traveled distance of the input movement gesture. As such, in block 740, the playback control module 202 shifts the primary display window 300 based on the traveled distance of the movement gesture (as determined in block 734). For example, the playback control module 202 may shift the primary display window 300 a distance proportional to the horizontal displacement of the movement gesture on the display 130.

In addition to shifting the primary display window 300, the playback control module also adjusts the playback of media content displayed in the primary display window 300 based on the direction of the input movement gesture in block 744. For example, if the input movement gesture is determined to be a left-to-right movement gesture, the playback control module 202 skips backwardly in the media content by displaying corresponding frames of the media content in the primary display window 300 based on the current travelled distance of the input movement gesture. Alternatively, if the input movement gesture is determined to be a right-to-left movement gesture, the playback control module 202 skips forwardly in the media content by displaying corresponding frames of the media content in the primary display window based on the current travelled distance of the input movement gesture. In this way, the user may visually monitor the forward or backward skipping of the media content as the user continues the input movement gesture.

In the illustrative embodiment, the amount of media content skipped (i.e., the temporal difference between the initial frame of media content and the current skipped-to frame of media content) is proportional to the updated traveled distance relative to a total available distance of the movement input gesture (e.g., the total distance between the origination point of the input movement gesture on the display 130 and a corresponding side of the display 130). That is, the number of frames skipped for each pixel of movement of the user's input gesture on the touchscreen 131 is based on the total available distance of the movement input gesture. As such, the further the overall distance traveled of the movement gesture, the finer granularity of the skipped frames (i.e., the frames-per-pixel ratio is decreased). Conversely, the shorter the overall distance traveled by the movement gesture, the coarser granularity of the skipped frames (i.e., the frames-per-pixel ratio is increased), which insures represented frames of the complete media content between the currently displayed frame and the frame at the next/previous skip point is displayed to the user.

Subsequent to, or contemporaneously with execution of the blocks 738-744, the playback control module 202 also shifts a new display window 302 onto the display 130 in a direction similar to the direction of the input movement gesture in block 746. If necessary, the media consumption device 102 may first generate a new display window 302 in block 748. In some embodiments, and as performed in block 750, the playback control module 202 may shift the new display window 302 onto the display 130 from the opposite side of the display 130 based on the direction of the movement gesture. For example, if the input movement gesture is a left-to-right movement gesture, the playback control module 202 may shift the new display window 302 onto the display 130 from the left side of the display 130. Alternatively, if the input movement gesture is a right-to-left movement gesture, the playback control module 202 may shift the new display window 302 onto the display 130 from the right side of the display 130.

Similar to the primary display window 300, the new display window 302 may be shifted on the display 130 based on the updated traveled distance of the input movement gesture in block 752. Such shifting of the new display window 302 is similar to the shifting of the primary display window 300 such that the windows 300, 302 are shifted together or otherwise in unison with each other as shown illustratively in FIGS. 4 and 5 discussed above. For example, the new display window 302 may be shifted horizontally across the display 130 a distance proportional to the horizontal displacement of the input movement gesture in block 752.

In block 754, the playback control module 202 also displays a frame of the media content occurring at the next or previous skip point in the new display window 302. That is, as discussed above, the relative skip point is determined based on the type of input movement gesture. If the input movement gesture is determined to be a left-to-right input movement gesture, the playback control module 202 displays the frame of the media content occurring at the most previous skip point (i.e., the next skip point occurring prior to the frame of media content displayed in the primary display window 300). Alternatively, if the input movement gesture is determined to be a right-to-left input movement gesture, the playback control module 202 displays the frame of the media content occurring at the next skip point (i.e., the next skip point occurring after the frame of media content displayed in the primary display window 300).

Figure 10:
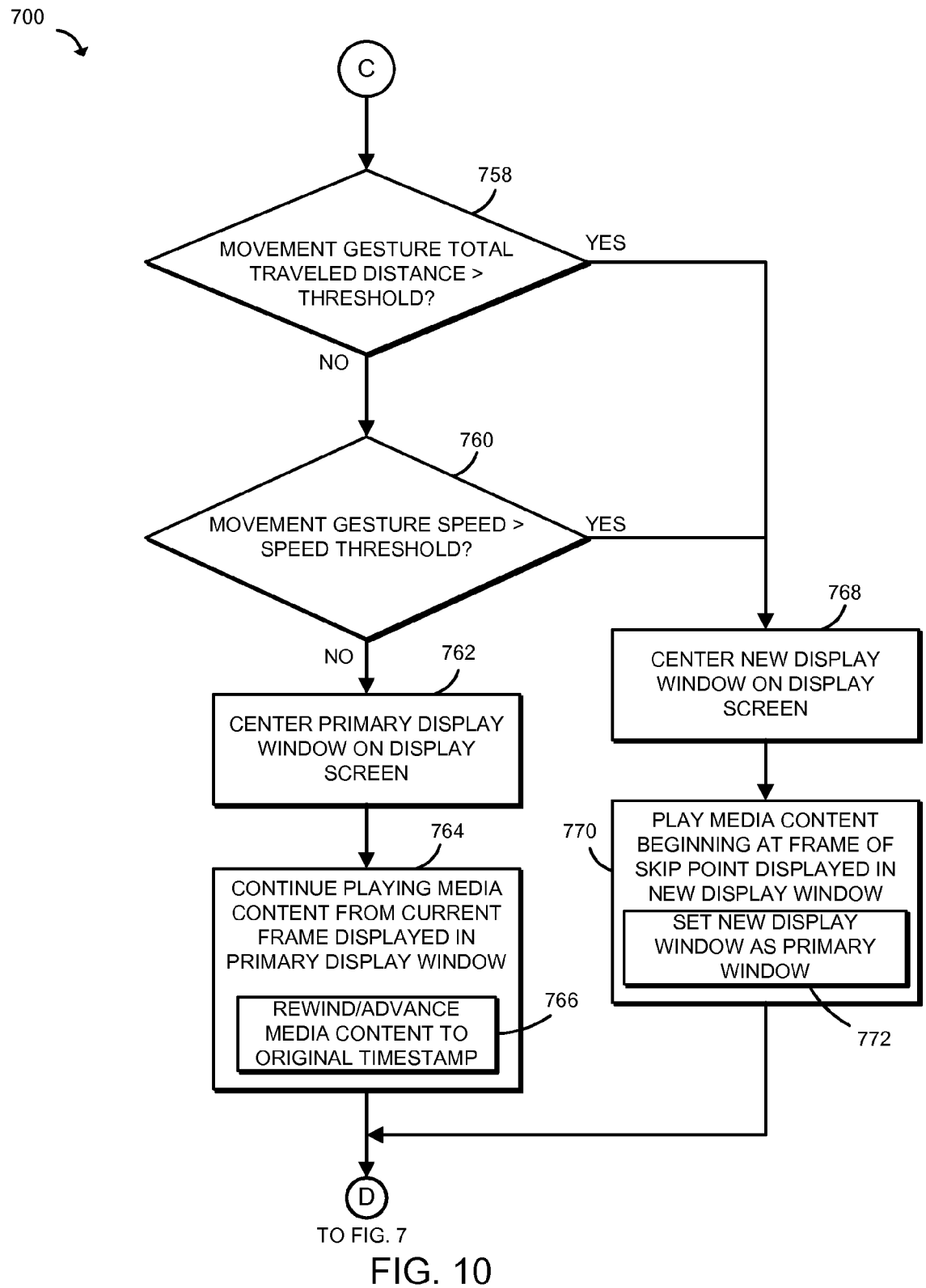

Additionally, in some embodiments, the playback control module 202 may display various feedback data to the user on the display 130 in block 756. For example, such feedback data may include data related to the skip point including, but not limited to, a title, scene description, skip point timestamp, and/or the like, to provide the user additional feedback about the media content he or she intends to view. The method 700 subsequently loops back to block 728 (see FIG. 8) in which the input gesture determination module 204 continues to monitor for and determine the type of the input gesture as discussed above Referring back to block 732 of FIG. 8, if input gesture determination module 204 determines that the input gesture is an input termination gesture (e.g., a touch up gesture indicating the movement gesture is completed), the method 700 advances to block 758 (see FIG. 10). In block 758, the input gesture determination module 204 determines whether the total traveled distance of the input movement gesture is greater than a threshold distance. To do so, the input gesture determination module 204 determines whether the input gesture moved a distance greater than a threshold distance, which may be defined as any fraction of, or the entire width of the display 130. For example, the input gesture determination module 204 may determine whether the input gesture traveled a distance greater than half the width of the touchscreen 131 of the display 130. If not, the method 700 advances to block 760 in which the input gesture determination module 204 determines whether the input gesture travel speed has exceeded a threshold speed. The threshold speed may be determined or selected based on the physical characteristics of the display 130 (e.g., the total width), measurement characteristics of the touchscreen 131, physiological characteristics of users, and/or any other useful criteria. Additionally, in some embodiments, a user of the media consumption device may adjust the distance and speed thresholds.

If neither the traveled distance nor the speed of the input movement gesture exceeds the respective thresholds, the method 700 advances to block 762 in which the playback control module 202 restores the primary display window back to its original position (e.g., in the center of the display 130). Additionally, in block 764, the playback control module 202 continues playing the media content from the frame currently displayed in the primary display window 300. To do so, in block 766, the playback control module 202 may rewind or advance the media content displayed in the primary display window 300 to the timestamp corresponding to the time at which the user initiated the input gesture in block 716. The method 700 subsequently loops back to block 714 (see FIG. 7) in which the playback control module 202 continues playing the media content in the current primary display window 300.

However, referring back to blocks 758 and 760, if either or both of the traveled distance nor the speed of the input movement gesture speed exceeds the respective thresholds, the method 700 advances to block 768 in which the playback control module 202 centers, or otherwise positions, the new display window 302 on the display 130, and the primary display window 300 is shifted completely off of, or otherwise removed from, the display 130. Additionally, in block 770, the playback control module 202 plays the media content beginning at the frame corresponding to the skip point displayed in the new display window 302. Accordingly, in block 772, the new display window 302 is set as the primary display window 300. The method 700 subsequently loops back to block 714 (see FIG. 7) in which the playback control module 202 continues playing the media content in the current primary display window 300.

Figure 11:
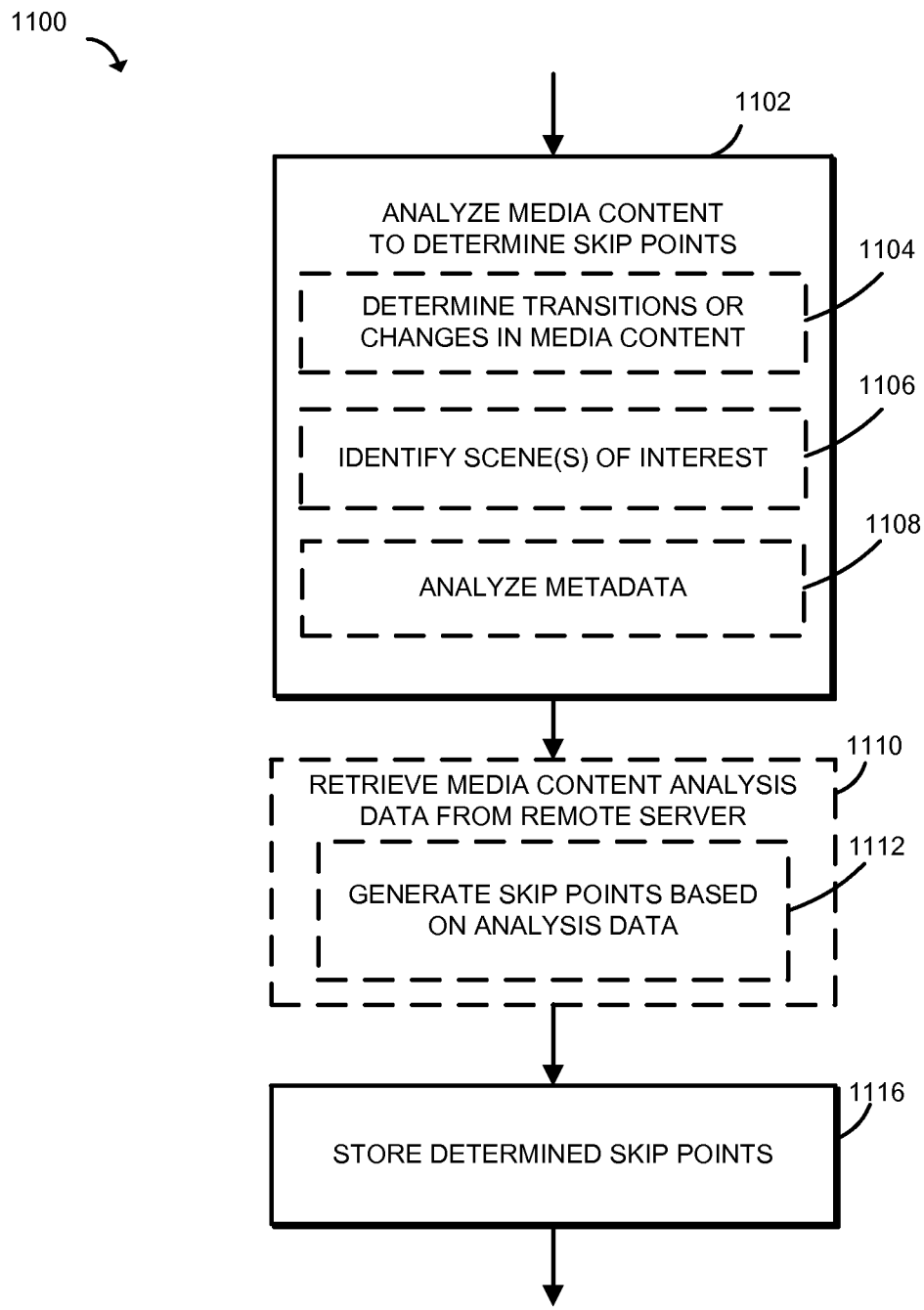
FIG. 11 is a simplified flow diagram of at least one embodiment of a method for analyzing media content to determine skip points that may be executed by a media content distribution system and/or the media consumption device of the system of FIG. 1.

Referring now to FIG. 11, a method 1100 for analyzing media content to determine skip points is shown. The method 1100 may be executed by any device of the system 100 of FIG. 1 desiring to determine skip points for particular media content. For example, the method 1100 may be executed by the media consumption device 102 (see block 712 of method 700), the remote media content distribution system 106, and/or the remote server 110. As such, although the method 1100 is described below in regard to the media analysis module 216 of the media consumption device 102, it should be appreciated that the method 1100 may be executed by other devices of the system 100 in addition to, or alternatively to, the media consumption device 102 in other embodiments.

The method 1100 begins with block 1102 in which the media analysis module 216 analyzes the media content to determine one or more skip points based thereon. To do so, the media analysis module 216 may utilize any suitable analysis methodology or algorithm to generate the skip points. For example, in some embodiments, in block 1104, the media analysis module 216 may determine transitions occurring in the media content. To do so, the media analysis module 216 may identify identical or substantially similar frames to identify a substantial transition or break between scenes of the media content. Additionally or alternatively, in block 1106, the media analysis module 216 may identify scenes of interest. The scenes of interest may be determined based on any criteria such as, for example, actors in the scene, objects displayed in the scene, the level of action in the scene, or other characteristics of the scene. To determine the presence of such characteristics in a scene, the media analysis module 216 may utilize any suitable media analysis technique including, but not limited to, facial recognition algorithms, object detection algorithms, and/or the other video analysis techniques. Additionally or alternatively, in block 1108, the media analysis module 216 may analyze metadata associated with the media content to determine the skip points. The metadata may directly identify the skip points (e.g., by temporal location) or may provide data from which the media analysis module 216 can determine the skip points (e.g., identify particular actors or objects on which the skip points should be based). Accordingly, the media analysis module 216 may generate skip points based on identified scene(s), transition(s), other changes, or metadata in the media content.

Additionally or alternatively, in block 1110, the media analysis module 216 may retrieve media content analysis data from a remote server 110. In this way, in block 1112, the media analysis module 216 may generate the skip points based on the retrieve media content analysis data as discussed above. Regardless, after the media analysis module 216 has generated or retrieved the skip points for the media content, the media analysis module 216 locally stores the determined skip points in the data storage 134 as the skip point data 142.

EXAMPLES

Illustrative examples of the technologies disclosed herein are provided below. An embodiment of the technologies may include any one or more, and any combination of, the examples described below.

Example 1 includes a media consumption device for playback of media content, the media consumption device comprising a playback control module to play the media content in a first display window displayed on a display screen; an input gesture determination module to receive an input gesture of the user; and a skip point determination module to determine a skip point of the media content based on the input gesture, wherein the playback control module is to (i) shift the first display window toward a first side of the display screen based on the input gesture, (ii) adjust playback of the media content displayed in the first display window based on the input gesture, (iii) shift a second display window onto the display screen from a second side of the display screen opposite the first side based on the input gesture, and (iv) display a frame of the media content corresponding to the skip point in the second display window.

Example 2 includes the subject matter of Example 1, and wherein to adjust playback of the media content comprises to skip media content displayed in the first display window based on the input gesture.

Example 3 includes the subject matter of any of Examples 1 and 2, and wherein to skip media content comprises to skip over a number of frames of the media content to a determined frame of media content displayed in the first display window, wherein the number of frames of media content is based on the input gesture.

Example 4 includes the subject matter of any of Examples 1-3, and wherein the input gesture determination module is further to determine whether the input gesture is a movement gesture; and determine a travelled distance of the movement gesture relative to a reference location, wherein to adjust the playback of the media content comprises to skip media content displayed in the first display window based on the travelled distance of the movement gesture.

Example 5 includes the subject matter of any of Examples 1-4, and wherein to skip media content comprises to skip a number of frames of the media content based on the travelled distance of the movement gesture.

Example 6 includes the subject matter of any of Examples 1-5, and wherein to determine whether the input gesture is a movement gesture comprises to determine whether the input gesture is a left-to-right movement gesture, and to skip the media content comprises to skip backwardly in the media content displayed in the first display window by an amount of media content that is based on the travelled distance of the movement gesture in response to the determination that the input gesture is a left-to-right movement gesture.

Example 7 includes the subject matter of any of Examples 1-6, and wherein to determine whether the input gesture is a movement gesture comprises to determine whether the input gesture is a right-to-left movement gesture, and to skip the media content comprises to skip forwardly in the media content displayed in the first display window by an amount of media content that is based on the travelled distance of the movement gesture in response to the determination that the input gesture is a right-to-left movement gesture.

Example 8 includes the subject matter of any of Examples 1-7, and wherein the input gesture determination module is further to determine whether the input gesture is a movement gesture; and determine a current location of the movement gesture relative to the display screen, wherein to adjust the playback of the media content comprises to display a frame of the media content in the first display window based on the current location of the movement gesture.

Example 9 includes the subject matter of any of Examples 1-8, and wherein the input gesture determination module is further to determine an initial location of the movement gesture relative to the display screen, wherein to display the frame of the media content comprises to display a frame of the media content in the first display window based on a difference between the current location and the initial location of the movement gesture.

Example 10 includes the subject matter of any of Examples 1-9, and wherein the input gesture determination module is to determine whether the input gesture is a movement gesture; and determine a direction of the movement gesture in response to determining the input gesture is a movement gesture, wherein to adjust the playback of the media content comprises to skip media content displayed in the first display window in a direction based on the direction of the movement gesture.

Example 11 includes the subject matter of any of Examples 1-10, and wherein the input gesture determination module is to determine whether the input gesture is a movement gesture; and determine a travelled distance of the movement gesture relative to a reference location, wherein to shift the first display window and the second display window comprises to shift the first display window and the second display window based on the travelled distance of the movement gesture.

Example 12 includes the subject matter of any of Examples 1-11, and wherein the input gesture determination module is to determine whether the input gesture is a movement gesture, and determine a direction of the movement gesture in response to the determination that the input gesture is a movement gesture, wherein to shift the first display window and the second display window comprises to shift the first display window and the second display window based on the direction of the movement gesture.

Example 13 includes the subject matter of any of Examples 1-12, and wherein to determine the direction of the movement gesture comprises to determine whether the movement gesture is a left-to-right movement gesture; and to shift the first display window and the second display window comprises to shift the first display window and the second display window in a left-to-right direction.

Example 14 includes the subject matter of any of Examples 1-13, and wherein to determine the direction of the movement gesture comprises to determine whether the movement gesture is a right-to-left movement gesture; and to shift the first display window and the second display window comprises to shift the first display window and the second display window in a right-to-left direction.

Example 15 includes the subject matter of any of Examples 1-14, and wherein to determine the skip point of the media content comprises to determine whether the input gesture is a movement gesture; to determine a direction of the movement gesture in response to the determination that the input gesture is a movement gesture, and to determine a skip point of the media content based on the direction of the movement gesture.

Example 16 includes the subject matter of any of Examples 1-15, and wherein to determine the direction of the movement gesture comprises to determine whether the movement gesture is a left-to-right movement gesture; and to determine the skip point comprises to determine a next skip point located later in the media content relative to the current frame of the media content displayed in the first display window in response to the determination that the movement gesture is a left-to-right movement gesture.

Example 17 includes the subject matter of any of Examples 1-16, and wherein to determine the direction of the movement gesture comprises to determine whether the movement gesture is a right-to-left movement gesture; and to determine the skip point comprises to determine a previous skip point located prior in the media content relative to the current frame of the media content displayed in the first display window in response to the determination that the movement gesture is a right-to-left movement gesture.

Example 18 includes the subject matter of any of Examples 1-17, and wherein to determine the skip point of the media content comprises to retrieve a pre-defined skip point of the media content from a data storage.

Example 19 includes the subject matter of any of Examples 1-18, and wherein to determine the skip point of the media content comprises to determine a temporal skip point of the media content.

Example 20 includes the subject matter of any of Examples 1-19, and wherein to determine the skip point of the media content comprises to analyze the media content to determine at least one of (i) a transition of the media content, (ii) a scene of the media content, or (iii) a change in the media content; and to determine a skip point of the media content based on the at least one of the transition, scene, or change in the media content.

Example 21 includes the subject matter of any of Examples 1-20, and wherein to determine the skip point of the media content comprises to analyze the metadata associated with the media content; and determine a skip point based on the metadata.

Example 22 includes the subject matter of any of Examples 1-21, and wherein the playback control module is to display information indicative of the skip point in the second display window.

Example 23 includes the subject matter of any of Examples 1-22, and wherein the input gesture determination module is to determine whether the input gesture is an input termination gesture and determine a total traveled distance of the input gesture in response to the determination that the input gesture is an input termination gesture; and the playback control module is to, in response to the total traveled distance being greater than a threshold distance, (i) center the second display window on the display screen and (ii) initiate playback of the media content in the second display window beginning at the skip point.

Example 24 includes the subject matter of any of Examples 1-23, and wherein the input gesture determination module is to determine whether the input gesture is an input termination gesture and determine a speed of the input gesture in response to the determination that the input gesture is an input termination gesture; and the playback control module is to, in response to the speed being greater than a threshold speed, (i) center the second display window on the display screen and (ii) initiate playback of the media content in the second display window beginning at the skip point.

Example 25 includes the subject matter of any of Examples 1-24, and wherein the input gesture direction determination module is to (i) determine whether the input gesture is an input termination gesture, (ii) determine a total traveled distance of the input gesture in response to the determination that the input gesture is an input termination gesture, (iii) and determine a speed of the input gesture in response to the determination that the input gesture is an input termination gesture; and the playback control module is to, in response to the total traveled distance being less than a threshold distance and the speed being less than a speed threshold, (i) center the first display window on the display screen and (ii) continue playback of the media content in the first display window beginning at the current frame displayed in the first display window.

Example 26 includes a method for playback of media content on a media consumption device, the method comprising playing, by the media consumption device, the media content in a first display window displayed on a display screen; determining, by the media consumption device, a skip point of the media content based on an input gesture of the user received by the media consumption device; shifting, by the media consumption device, the first display window toward a first side of the display screen based on the input gesture; adjusting, by the media consumption device, playback of the media content displayed in the first display window based on the input gesture; shifting, by the media consumption device, a second display window onto the display screen from a second side of the display screen opposite the first side based on the input gesture; and displaying, by the media consumption device, a frame of the media content corresponding to the skip point in the second display window.

Example 27 includes the subject matter of Example 26, and wherein to adjusting playback of the media content comprises skipping media content displayed in the first display window based on the input gesture.

Example 28 includes the subject matter of any of Examples 26 and 27, and wherein skipping media content comprises determining a number of frames of media content to be skipped based on the input gesture, and skipping over the number of frames of the media content to a determined frame of media content displayed in the first display window.

Example 29 includes the subject matter of any of Examples 26-28, and further including determining whether the input gesture is a movement gesture; and determining a travelled distance of the movement gesture relative to an reference location, wherein adjusting the playback of the media content comprises skipping media content displayed in the first display window based on the travelled distance of the movement gesture.

Example 30 includes the subject matter of any of Examples 26-29, and wherein skipping media content comprises skipping a number of frames of the media content based on the travelled distance of the movement gesture.

Example 31 includes the subject matter of any of Examples 26-30, and wherein determining whether the input gesture is a movement gesture comprises determining whether the input gesture is a left-to-right movement gesture, and skipping media content comprises skipping backwardly in the media content displayed in the first display window by an amount of media content that is based on the travelled distance of the movement gesture in response to determining the input gesture is a left-to-right movement gesture.

Example 32 includes the subject matter of any of Examples 26-31, and wherein determining whether the input gesture is a movement gesture comprises determining whether the input gesture is a right-to-left movement gesture, and skipping media content comprises skipping forwardly in the media content displayed in the first display window by an amount of media content that is based on the travelled distance of the movement gesture in response to determining the input gesture is a right-to-left movement gesture.

Example 33 includes the subject matter of any of Examples 26-32, and further including determining whether the input gesture is a movement gesture; and determining a current location of the movement gesture relative to the display screen, wherein adjusting the playback of the media content comprises displaying a frame of the media content in the first display window based on the current location of the movement gesture.

Example 34 includes the subject matter of any of Examples 26-33, and further including determining an initial location of the movement gesture relative to the display screen, wherein displaying the frame of the media content comprises displaying a frame of the media content in the first display window based on a difference between the current location and the initial location of the movement gesture.

Example 35 includes the subject matter of any of Examples 26-34, and further including determining whether the input gesture is a movement gesture; and determining a direction of the movement gesture in response to determining the input gesture is a movement gesture, wherein adjusting the playback of the media content comprises skipping media content displayed in the first display window in a direction based on the direction of the movement gesture.

Example 36 includes the subject matter of any of Examples 26-35, and further including determining whether the input gesture is a movement gesture; determining a travelled distance of the movement gesture relative to an reference location, wherein shifting the first display window and the second display window comprises shifting the first display window and the second display window based on the travelled distance of the movement gesture.

Example 37 includes the subject matter of any of Examples 26-36, and further including determining whether the input gesture is a movement gesture; determining a direction of the movement gesture in response to determining the input gesture is a movement gesture, wherein shifting the first display window and the second display window comprises shifting the first display window and the second display window based on the direction of the movement gesture.

Example 38 includes the subject matter of any of Examples 26-37, and wherein determining the direction of the movement gesture comprises determining whether the movement gesture is a left-to-right movement gesture; and shifting the first display window and the second display window comprises shifting the first display window and the second display window in a left-to-right direction.

Example 39 includes the subject matter of any of Examples 26-38, and wherein determining the direction of the movement gesture comprises determining whether the movement gesture is a right-to-left movement gesture; and shifting the first display window and the second display window comprises shifting the first display window and the second display window in a right-to-left direction.

Example 40 includes the subject matter of any of Examples 26-39, and wherein determining the skip point of the media content comprises determining whether the input gesture is a movement gesture; determining a direction of the movement gesture in response to determining the input gesture is a movement gesture, determining a skip point of the media content based on the direction of the movement gesture.

Example 41 includes the subject matter of any of Examples 26-40, and wherein determining the direction of the movement gesture comprises determining whether the movement gesture is a left-to-right movement gesture; and determining the skip point comprises determining a next skip point located later in the media content relative to the current frame of the media content displayed in the first display window in response to determining the movement gesture is a left-to-right movement gesture.

Example 42 includes the subject matter of any of Examples 26-41, and wherein determining the direction of the movement gesture comprises determining whether the movement gesture is a right-to-left movement gesture; and determining the skip point comprises determining a previous skip point located prior in the media content relative to the current frame of the media content displayed in the first display window in response to determining the movement gesture is a right-to-left movement gesture.

Example 43 includes the subject matter of any of Examples 26-42, and wherein determining the skip point of the media content comprises retrieving a pre-defined skip point of the media content from a data storage.

Example 44 includes the subject matter of any of Examples 26-43, and wherein determining the skip point of the media content comprises determining a temporal skip point of the media content.

Example 45 includes the subject matter of any of Examples 26-44, and wherein determining the skip point of the media content comprises analyzing the media content to determine at least one of (i) a transition of the media content, (ii) a scene of the media content, or (iii) a change in the media content; and determining a skip point of the media content based on the at least one of the transition, scene, or change in the media content.

Example 46 includes the subject matter of any of Examples 26-45, and wherein determining the skip point of the media content comprises analyzing the metadata associated with the media content; and determining a skip point based on the metadata.

Example 47 includes the subject matter of any of Examples 26-46, and further including displaying information indicative of the skip point in the second display window.

Example 48 includes the subject matter of any of Examples 26-47, and further including determining whether the input gesture is an input termination gesture; determining a total traveled distance of the input gesture in response to determining the input gesture is an input termination gesture; and in response to the total traveled distance being greater than a threshold distance, (i) centering the second display window on the display screen and (ii) initiating playback of the media content in the second display window beginning at the skip point.

Example 49 includes the subject matter of any of Examples 26-48, and further including determining whether the input gesture is an input termination gesture; determining a speed of the input gesture in response to determining the input gesture is an input termination gesture; and in response to the speed being greater than a threshold speed, (i) centering the second display window on the display screen and (ii) initiating playback of the media content in the second display window beginning at the skip point.

Example 50 includes the subject matter of any of Examples 26-49, and further including determining whether the input gesture is an input termination gesture; determining a total traveled distance of the input gesture in response to determining the input gesture is an input termination gesture; determining a speed of the input gesture in response to determining the input gesture is an input termination gesture; and in response to the total traveled distance being less than a threshold distance and the speed being less than a speed threshold, (i) centering the first display window on the display screen and (ii) continuing playback of the media content in the first display window beginning at the current frame displayed in the first display window.

Example 51 includes one or more machine-readable media comprising a plurality of instructions stored thereon that in response to being executed result in a media consumption device performing the method of any of Examples 26-50.

Example 52 includes a media consumption device for playback of media content, the media consumption device comprising means for playing the media content in a first display window displayed on a display screen; means for determining a skip point of the media content based on an input gesture of the user received by the media consumption device; means for shifting the first display window toward a first side of the display screen based on the input gesture; means for adjusting playback of the media content displayed in the first display window based on the input gesture; means for shifting a second display window onto the display screen from a second side of the display screen opposite the first side based on the input gesture; and means for displaying a frame of the media content corresponding to the skip point in the second display window.

Example 53 includes the subject matter of Example 52, and wherein means for adjusting playback of the media content comprises means for skipping media content displayed in the first display window based on the input gesture.

Example 54 includes the subject matter of any of Examples 52 and 53, and wherein means for skipping media content comprises means for determining a number of frames of media content to be skipped based on the input gesture, and means for skipping over the number of frames of the media content to a determined frame of media content displayed in the first display window.

Example 55 includes the subject matter of any of Examples 52-54, and further including means for determining whether the input gesture is a movement gesture; and means for determining a travelled distance of the movement gesture relative to an reference location, wherein the means for adjusting the playback of the media content comprises means for skipping media content displayed in the first display window based on the travelled distance of the movement gesture.

Example 56 includes the subject matter of any of Examples 52-55, and wherein the means for skipping media content comprises means for skipping a number of frames of the media content based on the travelled distance of the movement gesture.

Example 57 includes the subject matter of any of Examples 52-56, and wherein the means for determining whether the input gesture is a movement gesture comprises means for determining whether the input gesture is a left-to-right movement gesture, and the means for skipping media content comprises means for skipping backwardly in the media content displayed in the first display window by an amount of media content that is based on the travelled distance of the movement gesture in response to determining the input gesture is a left-to-right movement gesture.

Example 58 includes the subject matter of any of Examples 52-57, and wherein the means for determining whether the input gesture is a movement gesture comprises means for determining whether the input gesture is a right-to-left movement gesture, and the means for skipping media content comprises means for skipping forwardly in the media content displayed in the first display window by an amount of media content that is based on the travelled distance of the movement gesture in response to determining the input gesture is a right-to-left movement gesture.

Example 59 includes the subject matter of any of Examples 52-58, and further including means for determining whether the input gesture is a movement gesture; and means for determining a current location of the movement gesture relative to the display screen, wherein the means for adjusting the playback of the media content comprises means for displaying a frame of the media content in the first display window based on the current location of the movement gesture.

Example 60 includes the subject matter of any of Examples 52-59, and further including means for determining an initial location of the movement gesture relative to the display screen, wherein the means for displaying the frame of the media content comprises means for displaying a frame of the media content in the first display window based on a difference between the current location and the initial location of the movement gesture.

Example 61 includes the subject matter of any of Examples 52-60, and further including means for determining whether the input gesture is a movement gesture; and means for determining a direction of the movement gesture in response to determining the input gesture is a movement gesture, wherein the means for adjusting the playback of the media content comprises means for skipping media content displayed in the first display window in a direction based on the direction of the movement gesture.

Example 62 includes the subject matter of any of Examples 52-61, and further including means for determining whether the input gesture is a movement gesture; means for determining a travelled distance of the movement gesture relative to an reference location, wherein the means for shifting the first display window and the second display window comprises means for shifting the first display window and the second display window based on the travelled distance of the movement gesture.

Example 63 includes the subject matter of any of Examples 52-62, and further including means for determining whether the input gesture is a movement gesture; means for determining a direction of the movement gesture in response to determining the input gesture is a movement gesture, wherein the means for shifting the first display window and the second display window comprises means for shifting the first display window and the second display window based on the direction of the movement gesture.

Example 64 includes the subject matter of any of Examples 52-63, and wherein the means for determining the direction of the movement gesture comprises means for determining whether the movement gesture is a left-to-right movement gesture; and the means for shifting the first display window and the second display window comprises means for shifting the first display window and the second display window in a left-to-right direction.

Example 65 includes the subject matter of any of Examples 52-64, and wherein the means for determining the direction of the movement gesture comprises means for determining whether the movement gesture is a right-to-left movement gesture; and the means for shifting the first display window and the second display window comprises means for shifting the first display window and the second display window in a right-to-left direction.

Example 66 includes the subject matter of any of Examples 52-65, and, wherein the means for determining the skip point of the media content comprises means for determining whether the input gesture is a movement gesture; means for determining a direction of the movement gesture in response to determining the input gesture is a movement gesture, means for determining a skip point of the media content based on the direction of the movement gesture.

Example 67 includes the subject matter of any of Examples 52-66, and wherein the means for determining the direction of the movement gesture comprises means for determining whether the movement gesture is a left-to-right movement gesture; and the means for determining the skip point comprises means for determining a next skip point located later in the media content relative to the current frame of the media content displayed in the first display window in response to determining the movement gesture is a left-to-right movement gesture.

Example 68 includes the subject matter of any of Examples 52-67, and wherein the means for determining the direction of the movement gesture comprises means for determining whether the movement gesture is a right-to-left movement gesture; and the means for determining the skip point comprises means for determining a previous skip point located prior in the media content relative to the current frame of the media content displayed in the first display window in response to determining the movement gesture is a right-to-left movement gesture.

Example 69 includes the subject matter of any of Examples 52-68, and wherein the means for determining the skip point of the media content comprises means for retrieving a pre-defined skip point of the media content from a data storage.

Example 70 includes the subject matter of any of Examples 52-69, and wherein the means for determining the skip point of the media content comprises means for determining a temporal skip point of the media content.

Example 71 includes the subject matter of any of Examples 52-70, and wherein the means for determining the skip point of the media content comprises means for analyzing the media content to determine at least one of (i) a transition of the media content, (ii) a scene of the media content, or (iii) a change in the media content; and means for determining a skip point of the media content based on the at least one of the transition, scene, or change in the media content.

Example 72 includes the subject matter of any of Examples 52-71, and wherein the means for determining the skip point of the media content comprises means for analyzing the metadata associated with the media content; and means for determining a skip point based on the metadata.

Example 73 includes the subject matter of any of Examples 52-72, and further including means for displaying information indicative of the skip point in the second display window.

Example 74 includes the subject matter of any of Examples 52-73, and further including means for determining whether the input gesture is an input termination gesture; means for determining a total traveled distance of the input gesture in response to determining the input gesture is an input termination gesture; and means for, in response to the total traveled distance being greater than a threshold distance, (i) centering the second display window on the display screen and (ii) initiating playback of the media content in the second display window beginning at the skip point.

Example 75 includes the subject matter of any of Examples 52-74, and further including means for determining whether the input gesture is an input termination gesture; means for determining a speed of the input gesture in response to determining the input gesture is an input termination gesture; and means for, in response to the speed being greater than a threshold speed, (i) centering the second display window on the display screen and (ii) initiating playback of the media content in the second display window beginning at the skip point.

Example 76 includes the subject matter of any of Examples 52-75, and further including means for determining whether the input gesture is an input termination gesture; means for determining a total traveled distance of the input gesture in response to determining the input gesture is an input termination gesture; means for determining a speed of the input gesture in response to determining the input gesture is an input termination gesture; and means for, in response to the total traveled distance being less than a threshold distance and the speed being less than a speed threshold, (i) centering the first display window on the display screen and (ii) continuing playback of the media content in the first display window beginning at the current frame displayed in the first display window.

The invention claimed is:

1. A media consumption device for playback of a video, the media consumption device comprising:
  a playback control module to play the video in a first display window displayed on a display screen;
  an input gesture determination module to receive an input gesture of the user, determine whether the input gesture is an input termination gesture, and determine a speed of the input gesture in response to the determination that the input gesture is an input termination gesture; and
  a skip point determination module to determine a skip point of the video based on the input gesture,
  wherein the playback control module is to (i) shift the first display window toward a first side of the display screen based on the input gesture, (ii) fast-forward or rewind playback of the video displayed in the first display window based on the input gesture, (iii) shift a second display window onto the display screen from a second side of the display screen opposite the first side based on the input gesture, (iv) display a frame of the video corresponding to the skip point in the second display window, and (v) in response to a determination that the speed of the input gesture is greater than a threshold speed, center the second display window on the display screen and initiate playback of the media content in the second display window begging at the skip point.

2. The media consumption device of claim 1, wherein to fast-forward or rewind the playback of the video comprises to skip over a number of frames of the video to a determined frame of video displayed in the first display window, wherein the number of frames of video is based on the input gesture.

3. The media consumption device of claim 1, wherein the input gesture determination module is further to:
  determine whether the input gesture is a movement gesture; and
  determine a travelled distance of the movement gesture relative to a reference location,
  wherein to fast-forward or rewind the playback of the video comprises to skip a number of frames of the video displayed in the first display window based on the travelled distance of the movement gesture.

4. The media consumption device of claim 1, wherein the input gesture determination module is further to:
  determine whether the input gesture is a movement gesture; and
  determine a current location of the movement gesture relative to the display screen,
  wherein to fast-forward or rewind the playback of the video comprises to display a frame of the video in the first display window based on the current location of the movement gesture.

5. The media consumption device of claim 1, wherein the input gesture determination module is to:
  determine whether the input gesture is a movement gesture; and
  determine a direction of the movement gesture in response to determining the input gesture is a movement gesture,
  wherein to fast-forward or rewind the playback of the video comprises to skip a number of frames of the video displayed in the first display window in a direction based on the direction of the movement gesture.

6. The media consumption device of claim 1, wherein to determine the skip point of the video comprises:
  to determine whether the input gesture is a movement gesture;
  to determine a direction of the movement gesture in response to the determination that the input gesture is a movement gesture, and
  to determine a skip point of the video based on the direction of the movement gesture.

7. The media consumption device of claim 1, wherein:
  the input gesture determination module is to determine a total traveled distance of the input gesture in response to the determination that the input gesture is an input termination gesture; and
  the playback control module is to, in response to the total traveled distance being greater than a threshold distance, center the second display window on the display screen and initiate playback of the video in the second display window beginning at the skip point.

8. The media consumption device of claim 1, wherein:
  the input gesture direction determination module is to determine a total traveled distance of the input gesture in response to the determination that the input gesture is an input termination gesture; and
  the playback control module is to, in response to the total traveled distance being less than a threshold distance and the speed being less than a speed threshold, (i) center the first display window on the display screen and (ii) continue playback of the video in the first display window beginning at the current frame displayed in the first display window.

9. One or more non-transitory, computer-readable storage media comprising a plurality of instructions that, in response to execution, cause a media consumption device to:
  play a video in a first display window displayed on a display screen;
  determine a skip point of the video based on an input gesture of the user received by the media consumption device;
  shift the first display window toward a first side of the display screen based on the input gesture;

fast-forward or rewind playback of the video displayed in the first display window based on the input gesture;
shift a second display window onto the display screen from a second side of the display screen opposite the first side based on the input gesture;
display a frame of the video corresponding to the skip point in the second display window;
determine whether the input gesture is an input termination gesture;
determine a speed of the input gesture in response to a determination that the input gesture is an input termination gesture; and
in response the speed being greater than a threshold speed, center the second display window on the display screen and initiate playback of the video in the second display window beginning at the skip point.

10. The one or more non-transitory, computer-readable storage media of claim 9, wherein to fast-forward or rewind the playback of the comprises to:
determine a number of frames of the video to be skipped based on the input gesture, and
skip over the number of frames of the video to a determined frame of displayed in the first display window.

11. The one or more non-transitory, computer-readable storage media of claim 9, wherein the plurality of instructions further cause the media consumption device to:
determine whether the input gesture is a movement gesture; and
determine a travelled distance of the movement gesture relative to an reference location,
wherein to fast-forward or rewind the playback of the video comprises to skip a number of frames of the video based on the travelled distance of the movement gesture.

12. The one or more non-transitory, computer-readable storage media of claim 9, wherein the plurality of instructions further cause the media consumption device to:
determine whether the input gesture is a movement gesture; and
determine a direction of the movement gesture in response to determining the input gesture is a movement gesture,
wherein to fast-forward or rewind the playback of the video comprises to skip a number of frame of the video displayed in the first display window in a direction based on the direction of the movement gesture.

13. The one or more non-transitory, computer-readable storage media of claim 9, wherein to determine the skip point of the video comprises to:
determine whether the input gesture is a movement gesture;
determine a direction of the movement gesture in response to determining the input gesture is a movement gesture; and
determine a skip point of the video based on the direction of the movement gesture.

14. The one or more non-transitory, computer-readable storage media of claim 9, wherein the plurality of instructions further cause the media consumption device to:
determine a total traveled distance of the input gesture in response to determining the input gesture is an input termination gesture; and
in response to the total traveled distance being greater than a threshold distance, center the second display window on the display screen and initiate playback of the video in the second display window beginning at the skip point.

15. The one or more non-transitory, computer-readable storage media of claim 9, wherein the plurality of instructions further cause the media consumption device to:
determine a total traveled distance of the input gesture in response to determining the input gesture is an input termination gesture; and
in response to the total traveled distance being less than a threshold distance and the speed being less than a speed threshold, (i) center the first display window on the display screen and (ii) continue playback of the video in the first display window beginning at the current frame displayed in the first display window.

16. A method for playback of a video on a media consumption device, the method comprising:
playing, by the media consumption device, the video in a first display window displayed on a display screen;
determining, by the media consumption device, a skip point of the video based on an input gesture of the user received by the media consumption device;
shifting, by the media consumption device, the first display window toward a first side of the display screen based on the input gesture;
fast-forwarding or rewinding, by the media consumption device, playback of the video displayed in the first display window based on the input gesture;
shifting, by the media consumption device, a second display window onto the display screen from a second side of the display screen opposite the first side based on the input gesture;
displaying, by the media consumption device, a frame of the video corresponding to the skip point in the second display window;
determining whether the input gesture is an input termination gesture;
determining a speed of the input gesture in response to determining the input gesture is an input termination gesture; and
in response the speed being greater than a threshold speed, centering the second display window on the display screen and initiating playback of the video in the second display window beginning at the skip point.

17. The method of claim 16, wherein fast-forwarding or rewinding the playback of the video comprises:
determining a number of frames of the video to be skipped based on the input gesture, and
skipping over the number of frames of the video to a determined frame of the video displayed in the first display window.

18. The method of claim 16, further comprising:
determining whether the input gesture is a movement gesture; and
determining a travelled distance of the movement gesture relative to an reference location,
wherein fast-forwarding or rewinding the playback of the video comprises skipping a number of frames of the video based on the travelled distance of the movement gesture.

19. The method of claim 16, further comprising:
determining whether the input gesture is a movement gesture; and
determining a direction of the movement gesture in response to determining the input gesture is a movement gesture,
wherein fast-forwarding or rewinding the playback of the video comprises skipping a number of frames of the video displayed in the first display window in a direction based on the direction of the movement gesture.

20. The method of claim 16, wherein determining the skip point of the video comprises:
   determining whether the input gesture is a movement gesture;
   determining a direction of the movement gesture in response to determining the input gesture is a movement gesture,
   determining a skip point of the video based on the direction of the movement gesture.

21. The method of claim 16, further comprising:
   determining a total traveled distance of the input gesture in response to determining the input gesture is an input termination gesture; and
   in response the total traveled distance being greater than a threshold distance, centering the second display window on the display screen and initiating playback of the video in the second display window beginning at the skip point.

22. The method of claim 16, further comprising:
   determining a total traveled distance of the input gesture in response to determining the input gesture is an input termination gesture; and
   in response to the total traveled distance being less than a threshold distance and the speed being less than a speed threshold, (i) centering the first display window on the display screen and (ii) continuing playback of the video in the first display window beginning at the current frame displayed in the first display window.

* * * * *